(12) United States Patent
Kwon et al.

(10) Patent No.: US 8,580,420 B2
(45) Date of Patent: Nov. 12, 2013

(54) CABLE-TYPE SECONDARY BATTERY

(75) Inventors: Yo-Han Kwon, Daejeon (KR); Je-Young Kim, Daejeon (KR); Ki-Tae Kim, Daejeon (KR); Heon-Cheol Shin, Busan (KR); Hyung-Man Cho, Busan (KR); Hye-Ran Jung, Busan (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/340,740

(22) Filed: Dec. 30, 2011

(65) Prior Publication Data
US 2012/0100412 A1 Apr. 26, 2012

Related U.S. Application Data

(63) Continuation of application No. PCT/KR2011/004137, filed on Jun. 7, 2011.

(30) Foreign Application Priority Data

Aug. 25, 2010 (KR) .................. 10-2010-0082593

(51) Int. Cl.
*H01M 6/42* (2006.01)
*H01M 2/02* (2006.01)
*H01M 6/08* (2006.01)

(52) U.S. Cl.
USPC .......................................... 429/149; 429/164

(58) Field of Classification Search
None
See application file for complete search history.

(56) References Cited

U.S. PATENT DOCUMENTS

2005/0147857 A1* 7/2005 Crumm et al. ................. 429/31
2007/0134549 A1* 6/2007 Nathan et al. ................ 429/149
2008/0241689 A1 10/2008 Takami et al.

FOREIGN PATENT DOCUMENTS

| JP | 04169066 A | * | 6/1992 |
| JP | 2008-243612 A | | 10/2008 |
| KR | 1020070009231 A | * | 1/2007 |
| KR | 10-0742739 B1 | | 7/2007 |
| KR | 10-0804411 B1 | | 2/2008 |
| KR | 10-2009-0009598 A | | 1/2009 |
| WO | WO 2005098994 A1 | * | 10/2005 |
| WO | 2009/014299 A1 | | 1/2009 |

OTHER PUBLICATIONS

English language abstract for KR 2007/0009231A Jan. 2007.*

* cited by examiner

*Primary Examiner* — Ula C Ruddock
*Assistant Examiner* — Daniel Gatewood
(74) *Attorney, Agent, or Firm* — Birch, Stewart, Kolasch & Birch, LLP

(57) ABSTRACT

Provided is a cable-type secondary battery including an electrode assembly having a horizontal cross section of a predetermined shape and extending longitudinally, and a wire-type outer current collector wound on the outer surface of the electrode assembly, the electrode assembly including an inner current collector, an anode active material layer, and an electrolyte layer, and a cathode active material layer; the wire-type outer current collector has excellent flexibility and a predetermined level of elasticity, and thus, improves the flexibility of the entire cable-type secondary battery and prevents a short circuit from occurring and the active material from falling off from the active material layer, due to the deformation of the cable-type secondary battery.

14 Claims, 2 Drawing Sheets

CABLE-TYPE SECONDARY BATTERY

CROSS-REFERENCE TO RELATED APPLICATION(S)

This application is a continuation of International Application PCT/KR2011/004137 filed on Jun. 7, 2011, which claims priority from Korean Patent Application No. 10-2010-0082593 filed in the Republic of Korea on Aug. 25, 2010, the entire contents of which are incorporated herein by reference.

BACKGROUND

1. Technical Field

The present invention relates to a cable-type secondary battery of free shape adaptation.

2. Background Art

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to help the start-up of vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape.

To fulfill this need, suggestions have been made to develop linear batteries having a very high ratio of length to cross-sectional diameter. Korean Patent No. 0804411 discloses a linear battery comprising a plurality of anodes and a plurality of cathodes with separators interposed therebetween. Korean Patent Registration No. 0742739 discloses a thread-type flexible battery including cathode threads and anode threads, however this is not easily adaptable in shape. Also, when an external force is applied to an outer current collector of a cable-type secondary battery, the outer current collector may deform to contact an inner current collector, resulting in a short circuit.

DISCLOSURE

Technical Problem

It is an object of the present invention to provide a secondary battery of a new linear structure that is easily adaptable in shape to maintain stability and excellent performance and to prevent a short circuit caused by the deformation of an outer current collector.

Technical Solution

A cable-type secondary battery of the present invention may include an electrode assembly having a horizontal cross section of a predetermined shape and extending longitudinally, and a wire-type outer current collector wound on the outer surface of the electrode assembly, the electrode assembly including an inner current collector, an anode active material layer, and an electrolyte layer, and a cathode active material layer.

In this instance, the current collector is preferably made from stainless steel, aluminum, nickel, titanium, sintered carbon, or copper; stainless steel surface-treated with carbon, nickel, titanium, or silver; aluminum-cadmium alloys; non-conductive polymer surface-treated with a conductive material; or conductive polymers. The conductive material may be polyacetylene, polyaniline, polypyrrole, polythiophene, polysulfur nitride, indium thin oxide (ITO), silver, palladium, or nickel, and the conductive polymer may be polyacetylene, polyaniline, polypyrrole, polythiophene, or polysulfur nitride.

The anode active material layer may be formed from natural graphite, artificial graphite, or carbonaceous materials; lithium-containing titanium composite oxides (LTOs); metals (Me) such as Si, Sn, Li, Zn, Mg, Cd, Ce, Ni, or Fe; alloys of the metals (Me); oxides (MeOx) of the metals (Me); or composites of the metals (Me) and carbon. The cathode active material layer may be formed from $LiCoO_2$, $LiNiO_2$, $LiMn_2O_4$, $LiCoPO_4$, $LiFePO_4$, $LiNiMnCoO_2$, or $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where $0 \leq x < 0.5$, $0 \leq y < 0.5$, $0 \leq z < 0.5$, $x+y+z \leq 1$).

The electrolyte layer may be formed from a gel polymer electrolyte of PEO, PVdF, PMMA, PAN, or PVAc; or a solid polymer electrolyte of PEO, polypropylene oxide (PPO), polyethylene imine (PEI), polyethylene sulphide (PES), or polyvinyl acetate (PVAc).

In the cable-type secondary battery of the present invention, the electrolyte layer may further include a lithium salt. The lithium salt may be LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chlorine borane lithium, aliphatic lower lithium carbonate, or tetraphenyl lithium borate.

Advantageous Effects

According to the present invention, the outer current collector wound on the outer surface of the electrode assembly has excellent flexibility and a predetermined level of elasticity, and thus, improves the flexibility of a cable-type secondary battery having the outer current collector.

Also, when an excessive external force is applied to the cable-type secondary battery of the present invention, the wire-type outer current collector of the present invention hardly surrenders to extreme deformation such as crushing or breakage due to the characteristics of the shape, thereby reducing the likelihood of a short circuit caused by the contact with the inner current collector.

Also, the wire-type outer current collector wound on the outer surface of the electrode assembly has elasticity, and thus, when deformed by an external force, disperses the force, thereby preventing the active material layer from deforming and consequently the active material from falling off from the active material layer.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

A cable-type secondary battery of the present invention includes an electrode assembly having a horizontal cross section of a predetermined shape and extending longitudinally, and a wire-type outer current collector wound on the outer surface of the electrode assembly. The electrode assembly includes an inner electrode, an anode active material layer, an electrolyte layer, and a cathode active material layer. Here, the predetermined shape is not limited to a specific shape, and may include any shape without departing from the spirit and scope of the present invention. The cable-type secondary battery of the present invention has a horizontal cross section of a predetermined shape and a linear structure extending longitudinally, perpendicular to the horizontal cross section. The cable-type secondary battery has flexibility and consequently free shape adaptation.

The electrode assembly of the present invention is not limited to a specific type, and may be of any type of electrode assembly including a cathode and an anode, and an electrolyte layer serving as an ion channel between the cathode and the anode, and an inner electrode includes the inner current collector and the cathode or anode active material layer. An outer electrode includes the wire-type outer current collector wound on the outer surface of the electrode assembly and an active material layer, and in this instance, the active material layer needs to be formed on the outmost surface of the electrode assembly in contact with the wire-type outer current collector.

Figure 1:
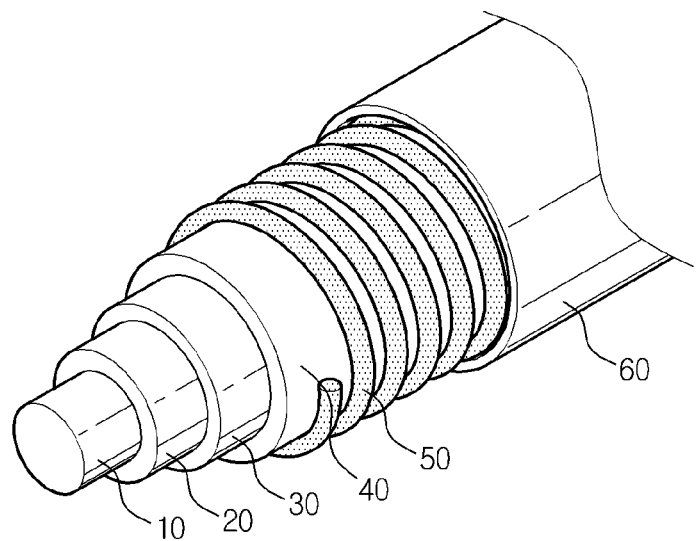
FIG. 1 is a perspective view of a cable-type secondary battery with one inner electrode according to an embodiment of the present invention.

As described above, the wire-type outer current collector wound on the outer surface of the electrode assembly forms the outer electrode with the active material layer formed on the outmost surface of the electrode assembly (see FIG. 1). The conventional wire-type current collector has excellent flexibility but because the area in contact with the active material layer is small, it has difficulty in ensuring a desired level of conductivity when used as an outer current collector. However, the wire-type outer current collector of the present invention has a sufficiently increased contact area with the active material layer, thereby ensuring the battery performance of a predetermined level. Also, the wire-type outer current collector of the present invention has elasticity due to its shape, and thus, improves the flexibility of the entire cable-type secondary battery.

Also, when an excessive external force is applied to the cable-type secondary battery of the present invention, the wire-type outer current collector of the present invention is less subject to excessive deformation, for example, crushing or breakage, due to the characteristics of the shape, and thus, reduces the likelihood of a short circuit caused by the contact with the inner current collector.

The electrode active material layer includes an electrode active material, a binder, and a conducting material, and forms the electrode with the current collector. When the electrode deforms by an external force, particularly the electrode is crushed or broken, the electrode active material may fall off from the electrode active material layer, resulting in reduced performance and capacity of the battery. However, according to the cable-type secondary battery of the present invention, the wire-type outer current collector wound on the outer surface of the electrode assembly is elastic, and thus, when an external force is applied, disperses the force, thereby preventing the active material layer from deforming and consequently the active material from falling off from the active material layer.

The electrode active material layer of the present invention allows ion migration through the current collector, and ion migration is carried out by intercalation/disintercalation of ions into/from the electrolyte layer.

Preferably, the current collector is made from stainless steel, aluminum, nickel, titanium, sintered carbon, or copper; stainless steel surface-treated with carbon, nickel, titanium, or silver; aluminum-cadmium alloys; non-conductive polymers surface-treated with a conductive material; or conductive polymers.

The current collector gathers the electrons generated by an electrochemical reaction of the active material, or supplies the electrons required for an electrochemical reaction. Generally, the current collector is made from metal such as copper or aluminum. However, when the current collector is particularly a polymer conductor of a non-conductive polymer surface-treated with a conductive material or of a conductive polymer, flexibility is relatively higher than that of the case where the current collector is made from metal such as copper or aluminum. Also, the polymer-based current collector may achieve weight reduction of the battery when compared with a metal-based current collector.

The conductive material may include polyacetylene, polyaniline, polypyrrole, polythiophene, polysulfur nitride, indium thin oxide (ITO), silver, palladium, or nickel. The conductive polymer may include polyacetylene, polyaniline, polypyrrole, polythiophene, or polysulfur nitride. However, the non-conductive polymer used in the current collector is not limited to a specific type of non-conductive polymer.

The anode active material layer may include, but is not limited to, natural graphite, artificial graphite, or carbonaceous materials; lithium-containing titanium composite oxides (LTOs); metals (Me) including Si, Sn, Li, Zn, Mg, Cd, Ce, Ni, or Fe; alloys of the metals (Me); oxides (MeOx) of the metals (Me); and composites of the metals (Me) and carbon.

The cathode active material may include, but is not limited to, $LiCoO_2$, $LiNiO_2$, $LiMn_2O_4$, $LiCoPO_4$, $LiFePO_4$, LiNiMnCoO$_2$, and LiNi$_{1-x-y-z}$Co$_x$M1$_y$M2$_z$O$_2$ (M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where 0≤x<0.5, 0≤y<0.5, 0≤z<0.5, x+y+z≤1).

In the cable-type secondary battery of the present invention, the electrolyte layer surrounding the inner electrode serves as an ion channel, and is formed from a gel polymer electrolyte of PEO, PVdF, PMMA, PAN, or PVAc; or a solid polymer electrolyte of PEO, polypropylene oxide (PPO), polyethylene imine (PEI), polyethylene sulphide (PES), or polyvinyl acetate (PVAc). Preferably, a matrix of the solid polymer electrolyte is basically a polymer matrix or a ceramic-glass matrix. Even though a typical polymer electrolyte has sufficient ion conductivity, ions may move slowly, that is, a reaction rate may be low, and thus, the gel polymer electrolyte having favorable ion movement is preferred over the solid polymer electrolyte. Because the gel polymer electrolyte has poor mechanical properties, a porous support or a crosslinked polymer may be used to improve the mechanical properties of the gel polymer electrolyte. The electrolyte layer of the present invention may act as a separator, thereby eliminating the use of a separator.

The electrolyte layer of the present invention may further include a lithium salt. The lithium salt may improve ion conductivity and reaction rate, and may include, but is not limited to, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chlorine borane lithium, aliphatic lower lithium carbonate, and tetraphenyl lithium borate.

The present invention has a protection coating formed on the outer surface of the outer current collector, and the protection coating may act as an insulator to protect the electrode from moisture in the air or from external impact. The protection coating may be formed from typical polymer resins, for example, PVC, HDPE, or epoxy resin.

Hereinafter, a cable-type secondary battery according to an embodiment of the present invention and a method for fabricating the cable-type secondary battery is briefly described with reference to FIG. 1 below.

A cable-type secondary battery according to an embodiment of the present invention includes an electrode assembly and a wire-type outer current collector 50 wound on the outer surface of the electrode assembly, and the electrode assembly includes an inner current collector 10 having a horizontal cross section of a predetermined shape and extending longitudinally, an anode active material layer 20 surrounding the inner current collector 10, an electrolyte layer 30 surrounding the anode active material layer 20 and serving as an ion channel, and a cathode active material layer 40 surrounding the electrolyte layer 30.

First, the wire-type linear anode current collector 10 is prepared and surface-coated with the anode active material layer 20. In this instance, a typical coating process may be used, specifically an electroplating process or an anodic oxidation process. To maintain a regular interval, it is preferred to extrusion-coat an electrode slurry including an active material through an extruder.

Subsequently, the anode active material layer 20 is surface-coated with the electrolyte layer 30. In this instance, a process forming the electrolyte layer 30 is not specially limited, however extrusion-coating is advantageous in fabricating the cable-type linear secondary battery due to the characteristics of the battery.

Then, the electrolyte layer 30 is surface-coated with the cathode active material layer 40. The same coating process as the anode active material layer 20 may be applied to the cathode active material layer 40. Next, the wire-type outer current collector 50 is wound on the outer surface of the cathode active material layer 40. A winding process is not specially limited, however a winding machine may be used to wind the wire-type outer current collector 50 on the outer surface of the cathode active material layer 40.

Finally, the protection coating 60 is formed on the outer surface of the wire-type outer current collector 50. The protection coating 60 is formed on the outmost surface, and acts as an insulator to protect the electrode from moisture in the air or from external impact. The protection coating 60 may be formed from typical polymer resins, for example, PVC, HDPE, or epoxy resin.

Alternatively, the cable-type secondary battery provided with a cathode as an inner electrode and an anode as an outer electrode may include the electrode assembly and the wire-type outer current collector 50 wound on the outer surface of the electrode assembly, and the electrode assembly may include the inner current collector 10 having a horizontal cross section of a predetermined shape and extending longitudinally, the cathode active material layer 20 surrounding the inner current collector, the electrolyte layer 30 surrounding the cathode active material layer 20 and serving as an ion channel, and the anode active material layer 40 surrounding the electrolyte layer 30.

Hereinafter, another exemplary embodiment of the present invention is described with reference to FIGS. 2 and 3.

Figure 2:
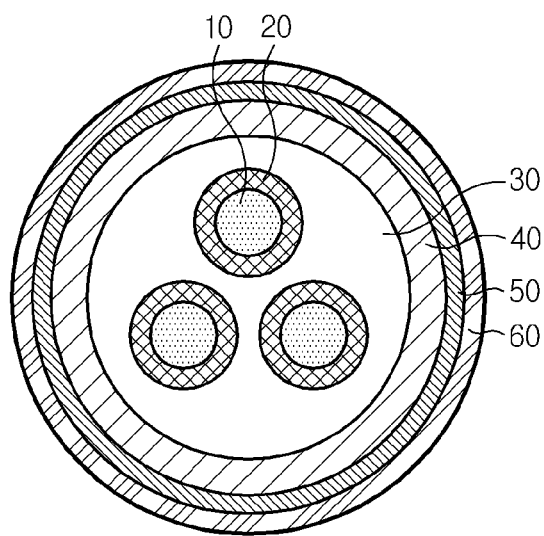
FIG. 2 is a cross-sectional view of a cable-type secondary battery with a plurality of anodes according to an embodiment of the present invention.

Referring to FIG. 2, the cable-type secondary battery of this exemplary embodiment may include the electrode assembly and the wire-type outer current collector 50 wound on the outer surface of the electrode assembly, the electrode assembly including an inner electrode comprising at least two anodes arranged in parallel, the electrolyte layer 30 surrounding the inner electrode and serving as an ion channel, and the cathode active material layer 40 surrounding the electrolyte layer 30, each anode being made up of the inner current collector 10 having a horizontal cross section of a predetermined shape and extending longitudinally, and the anode active material layer 20 surrounding the inner current collector 10.

Alternatively, the cable-type secondary battery provided with a cathode as an inner electrode and an anode as an outer electrode may include the electrode assembly and the wire-type outer current collector 50 wound on the outer surface of the electrode assembly, the electrode assembly including an inner electrode comprising at least two cathodes arranged in parallel, the electrolyte layer 30 surrounding the inner electrode and serving as an ion channel, and the anode active material layer 40 surrounding the electrolyte layer 30, each cathode being made up of the inner current collector 10 having a horizontal cross section of a predetermined shape and extending longitudinally, and the cathode active material layer 20 surrounding the inner current collector 10.

Figure 3:
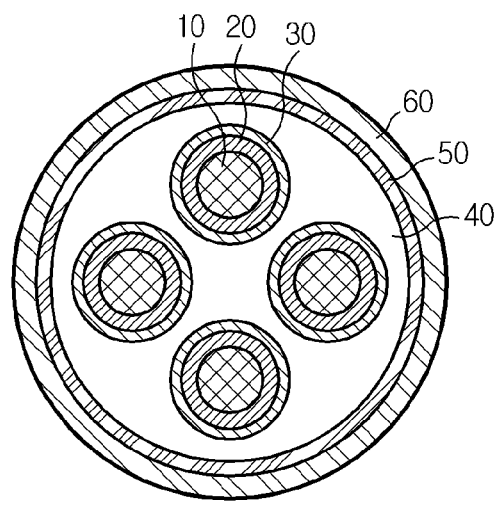
FIG. 3 is a cross-sectional view of a cable-type secondary battery with a plurality of anodes, each having an electrolyte layer on an outer surface, according to an embodiment of the present invention.

Referring to FIG. 3, the cable-type secondary battery of this exemplary embodiment may include the electrode assembly and the wire-type outer current collector 50 wound on the outer surface of the electrode assembly, the electrode assembly including an inner electrode comprising at least two anodes arranged in parallel, each including the inner current collector 10 having a horizontal cross section of a predetermined shape and extending longitudinally, the anode active material layer 20 surrounding the inner current collector 10, and the electrolyte layer 30 surrounding the anode active material layer 20 and serving as an ion channel, and including the cathode active material layer 40 surrounding the electrolyte layer 30.

Alternatively, the cable-type secondary battery provided with a cathode as an inner electrode and an anode as an outer electrode may include the electrode assembly and the wire-type outer current collector 50 wound on the outer surface of the electrode assembly, the electrode assembly including an inner electrode comprising at least two cathodes arranged in parallel, each including the inner current collector 10 having a horizontal cross section of a predetermined shape and extending longitudinally, the cathode active material layer 20 surrounding the inner current collector 10, and the electrolyte layer 30 surrounding the cathode active material layer 20 and serving as an ion channel, and including the anode active material layer 40 surrounding the electrolyte layer 30.

What is claimed is:

1. A cable-type secondary battery comprising:
   an electrode assembly including:
      an inner electrode comprising at least two electrodes arranged in parallel, each including an inner current collector having a horizontal cross section of a predetermined shape and extending longitudinally, and an inner electrode active material layer surrounding the inner current collector,
      an electrolyte layer surrounding the inner electrode and serving as an ion channel, and
      an outer electrode active material layer surrounding the electrolyte layer; and
   a wire-type outer current collector wound on the outer surface of the electrode assembly,
   wherein the inner electrode is an anode, and the outer electrode active material layer and the wire-type outer current collector define a cathode, or
   wherein the inner electrode is a cathode, and the outer electrode active material layer and the wire-type outer current collector define an anode.

2. The cable-type secondary battery according to claim 1, wherein the inner current collector is made from stainless steel, aluminum, nickel, titanium, sintered carbon, or copper; stainless steel surface-treated with carbon, nickel, titanium, or silver; aluminum-cadmium alloys; non-conductive polymer surface-treated with a conductive material; or conductive polymers.

3. The cable-type secondary battery according to claim 1, wherein the outer current collector is made from stainless steel, aluminum, nickel, titanium, sintered carbon, or copper; stainless steel surface-treated with carbon, nickel, titanium, or silver; aluminum-cadmium alloys; non-conductive polymer surface-treated with a conductive material; or conductive polymers.

4. The cable-type secondary battery according to claim 2, wherein the conductive material is any one selected from the group consisting of polyacetylene, polyaniline, polypyrrole, polythiophene, polysulfur nitride, indium thin oxide (ITO), silver, palladium, and nickel, or mixtures thereof.

5. The cable-type secondary battery according to claim 2, wherein the conductive polymer is any one selected from the group consisting of polyacetylene, polyaniline, polypyrrole, polythiophene, and polysulfur nitride, or mixtures thereof.

6. The cable-type secondary battery according to claim 1, wherein the anode active material layer is formed from an active material including an active material particle of any one selected from the group consisting of natural graphite, artificial graphite, or carbonaceous materials; lithium-containing titanium composite oxides (LTOs); metals (Me) including Si, Sn, Li, Zn, Mg, Cd, Ce, Ni, and Fe; alloys of the metals (Me); oxides (MeOx) of the metals (Me); and composites of the metals (Me) and carbon, or mixtures thereof.

7. The cable-type secondary battery according to claim 1, wherein the cathode active material layer is formed from an active material including an active material particle of any one selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$, or mixtures (M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where $0 \leq x < 0.5$, $0 \leq y < 0.5$, $0 \leq z < 0.5$, $x+y+z \leq 1$).

8. The cable-type secondary battery according to claim 1, wherein the electrolyte layer is formed from an electrolyte selected from the group consisting of a gel polymer electrolyte of PEO, PVdF, PMMA, PAN, or PVAc; and a solid polymer electrolyte of PEO, polypropylene oxide (PPO), polyethylene imine (PEI), polyethylene sulphide (PES), or polyvinyl acetate (PVAc).

9. The cable-type secondary battery according to claim 1, wherein the electrolyte layer further includes a lithium salt.

10. The cable-type secondary battery according to claim 9, wherein the lithium salt is any one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chlorine borane lithium, aliphatic lower lithium carbonate, and tetra-phenyl lithium borate, or mixtures thereof.

11. A cable-type secondary battery comprising:
    an electrode assembly including:
       an inner electrode comprising at least two anodes arranged in parallel, each including an inner current collector having a horizontal cross section of a predetermined shape and extending longitudinally, an anode active material layer surrounding the inner current collector, and an electrolyte layer surrounding the anode active material layer and serving as an ion channel, and
       a cathode active material layer surrounding the electrolyte layer; and
    a wire-type outer current collector wound on the outer surface of the electrode assembly.

12. A cable-type secondary battery comprising:
    an electrode assembly including:
       an inner electrode comprising at least two cathodes arranged in parallel, each including an inner current collector having a horizontal cross section of a predetermined shape and extending longitudinally, a cathode active material layer surrounding the inner current collector, and an electrolyte layer surrounding the cathode active material layer and serving as an ion channel, and
       an anode active material layer surrounding the electrolyte layer; and
    a wire-type outer current collector wound on the outer surface of the electrode assembly.

13. The cable-type secondary battery according to claim 3, wherein the conductive material is any one selected from the group consisting of polyacetylene, polyaniline, polypyrrole, polythiophene, polysulfur nitride, indium thin oxide (ITO), silver, palladium, and nickel, or mixtures thereof.

14. The cable-type secondary battery according to claim 3, wherein the conductive polymer is any one selected from the group consisting of polyacetylene, polyaniline, polypyrrole, polythiophene, and polysulfur nitride, or mixtures thereof.

\* \* \* \* \*